United States Patent [19]
Batt et al.

[11] Patent Number: 5,205,043
[45] Date of Patent: Apr. 27, 1993

[54] PENDULUM JIGSAWS

[75] Inventors: Dennis M. Batt, Durham; Alan W. Briggs, Bishop Auckland, both of England

[73] Assignee: Black & Decker Inc., Newark, Del.

[21] Appl. No.: 824,676

[22] Filed: Jan. 23, 1992

[30] Foreign Application Priority Data

Jan. 23, 1991 [GB] United Kingdom ............... 9101460

[51] Int. Cl.$^5$ .............................................. B23D 49/04
[52] U.S. Cl. ..................................................... 30/393
[58] Field of Search ........................ 30/166, 392, 393; 83/776

[56] References Cited

U.S. PATENT DOCUMENTS

| | | |
|---|---|---|
| 2,946,358 | 7/1960 | Bruck ................................... 30/393 |
| 3,264,443 | 8/1966 | Farina et al. . |
| 3,971,132 | 7/1976 | Griffies et al. ....................... 30/393 |
| 4,010,380 | 3/1977 | Bailer et al. . |
| 4,238,884 | 12/1980 | Walton .................................. 30/393 |
| 4,240,204 | 12/1980 | Walton et al. ........................ 30/393 |
| 4,262,421 | 4/1981 | Bergler et al. ....................... 30/393 |
| 4,628,605 | 12/1986 | Clowers . |

FOREIGN PATENT DOCUMENTS

| | | |
|---|---|---|
| 0044925 | 2/1982 | European Pat. Off. . |
| 0073693 | 3/1983 | European Pat. Off. . |
| 0124198 | 7/1984 | European Pat. Off. . |
| 0151524 | 8/1985 | European Pat. Off. . |
| 2650470 | 5/1978 | Fed. Rep. of Germany . |
| 2053795 | 2/1981 | United Kingdom . |

Primary Examiner—Douglas D. Watts
Assistant Examiner—Paul M. Heyrana
Attorney, Agent, or Firm—Dennis A. Dearing; John D. Del Ponti; Charles E. Yocum

[57] ABSTRACT

FIG. 2 shows a jigsaw in which pendulum motion in imparted on the blade (24) (see FIG. 1) by a bell crank lever (28) mounting a support wheel (26). The lever (28) is actuated by pin (34) passing through adjustment shaft (36). The pin (34) is actuated by fork lever (42) journalled around circular cam surface (48) and pivoted on axis (44). Cam surface (48) is eccentrically mounted on gear shaft axis (10). Rotational adjustment of shaft (36), which changes amplitude of reciprocation of pin (34) responsive to fork lever cam surface (54) is effected by pin (60) passing through shaft (36) and pivotally mounted in slide switch (70). Arrangement allows for compact design of saw.

7 Claims, 3 Drawing Sheets

PENDULUM JIGSAWS

BACKGROUND OF INVENTION

This invention relates to jigsaws and in particular to powered jigsaws which impart an orbital movement to the blade. That is to say, those which advance the blade slightly in the direction of feed during a cutting stroke. Such saws are also referred to as pendulum jigsaws when the advancement of the blade is through a pendulum action.

It is desirable in such jigsaws to provide the possibility of adjustment of the pendulum action because blade advancement is not always an advantage when cutting certain materials. One preferred arrangement is described in U.S. Pat. No. 4,238,884-Walton. In this arrangement, the roller supporting the back of the jigsaw blade is mounted on a bell crank lever. The other end of the lever is acted on by a pin passing through a shaft. In the region of the pin, the bell crank lever is provided with a circular cam profile which lies in the plane of rotation of the shaft and which is centered on the axis of the shaft. The other end of the pin is acted upon by a similar cam profile of a fork lever pivoted about an axis parallel to the shaft. The other end of the fork lever is forked and is journalled about an eccentric circular cam surface formed on a gear driven by the jigsaw motor. The same cam surface also moves a counterweight to balance the up and down movement of the jigsaw blade and carrier therefor.

The jigsaw blade and carrier are reciprocated by the gear. Thus as the motor rotates and the jigsaw carrier and blade are reciprocated, the fork lever is also reciprocated and through its cam surface, the pin and the bell crank lever, the blade is given a reciprocating movement in the feed direction of the saw, as well as its normal reciprocating cutting stroke along its axis.

The adjustment of the pendulum action is effected by rotation of the shaft so as to alter the points of application of the fork on the pin between maximum and minimum positions.

In U.S. Pat. No. 4,238,884, the shaft simply extends out of the rear of the housing of the saw and is provided with a knob for manual adjustment. However, because of the need to provide room between the motor housing and the sole plate of the saw in which to accommodate that knob, the saw appears somewhat "top-heavy" and unbalanced. Moreover, it is desirable to provide the saw with vacuum suction means in the region of the knob so that dust created during sawing can be removed and collected. It is therefore, an object of this invention to provide a jigsaw having the advantages and features of that disclosed in U.S. Pat. No. 4,238,884 but which does not suffer the aforementioned disadvantages.

SUMMARY OF THE INVENTION

In accordance with the invention, the saw comprises a blade carrier reciprocally slidable in a first direction. The blade carrier is driven by a drive train. The drive train comprises a gear having a cam surface. A fork lever is journalled on the gear cam surface and is pivoted about a first axis perpendicular to the first direction. A shaft is rotatably mounted about a second axis parallel to the first axis. A bell crank is pivoted in the housing about a third axis perpendicular to the first direction and to the first and second axes. A drive pin is slidably mounted in the shaft, has one end engaging a cam on the fork lever and has a second end engaging one end of the bell crank. A wheel is carried by the bell crank, disposed behind and supports in the saw feed direction a blade in the carrier and is reciprocally movable in the saw feed direction through the operation of the fork lever, drive pin and bell crank. A manually actuable slide switch is movably mounted in a plane spaced laterally from the shaft. An adjustment pin is interconnected between the shaft and the switch. The switch and adjustment pin constitute a switch assembly for rotating the shaft and adjusting the amplitude of reciprocation of the drive pin.

This arrangement moves the manually actuable pendulum adjustment mechanism from behind the housing to the side of the housing of the saw. Consequently, a more compact styling and appearance can be given to the saw with the housing being disposed relatively close to the sole plate of the saw. Moreover, room is now made in the region behind the pendulum adjustment mechanism to dispose a passage for a vacuum extraction means opening above and behind the saw blade.

Preferably, the switch is mounted in the housing for movement parallel to the first direction along a straight line. Means are provided for allowing for the distance of the switch from the shaft to change.

Preferably the allowing means comprises the adjustment pin being pivoted in the switch and being slidably fitted in a cross-bore in the shaft.

Preferably the switch comprises a knob slidably mounted in a rectangular slot in the housing, a carrier mounted on the knob inside the housing and covering the slot, and spring means mounted on the carrier and being adapted to engage one of several detents to locate the switch in different positions. The carrier has means to pivot the adjustment pin on the carrier. The means may comprise a bore parallel to the first and second axes when the adjustment pin is a slidably fitted in the shaft, otherwise it comprises a slot.

BRIEF DESCRIPTION OF THE DRAWINGS

The invention is further described hereinafter, by way of example only, with reference to the accompanying drawings, in which.

DESCRIPTION OF THE PREFERRED EMBODIMENT

Figure 1:
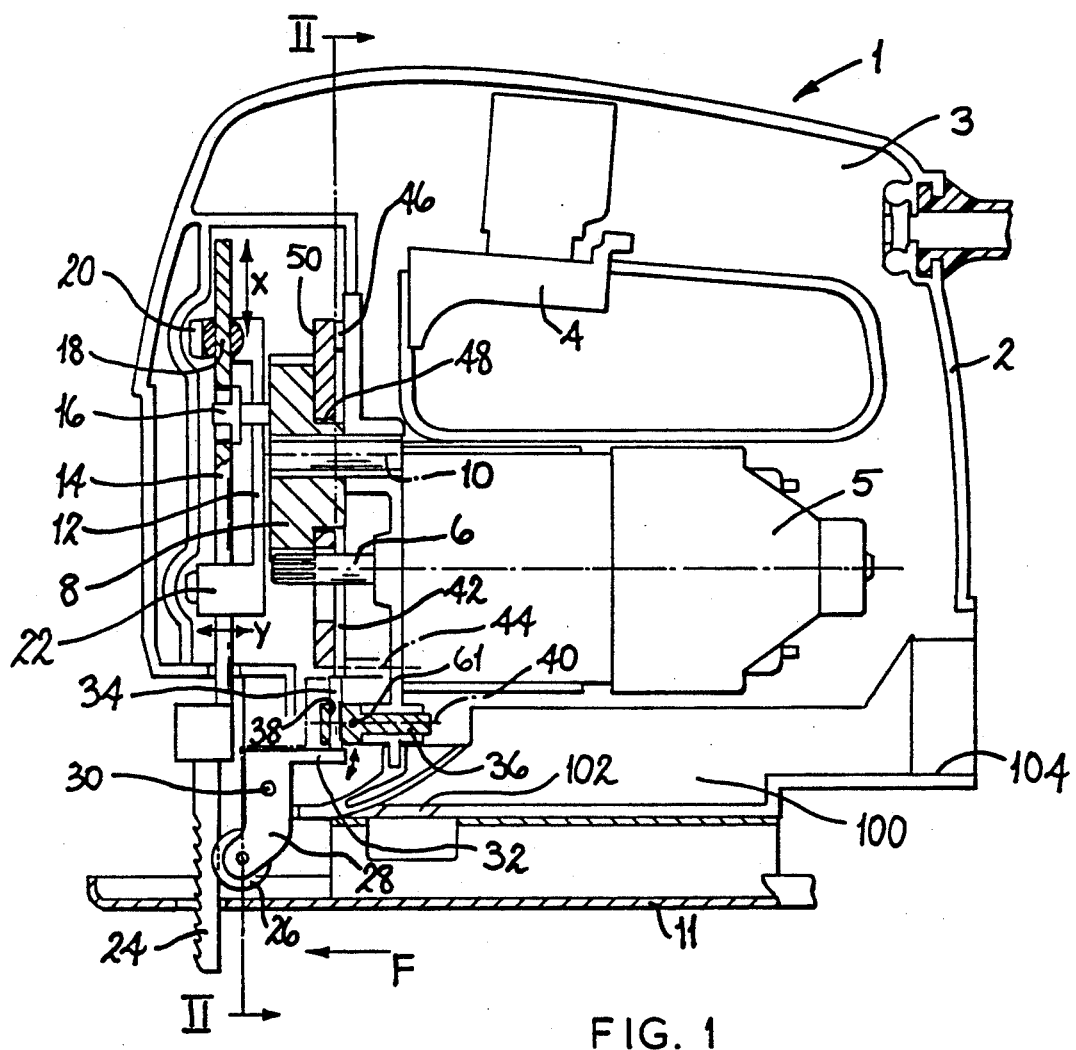
FIG. 1 is a schematic section through a jigsaw according to a preferred embodiment of the invention.

FIG. 1 shows a preferred embodiment of a pendulum jigsaw 1 in accordance with the invention. U.S. Pat. No. 4,238,884-Walton discloses a pendulum jigsaw substantially the same in design and operation as jigsaw 1 except for the switch assembly 7 for manually adjusting the orbital blade path as will be more fully described below. Pendulum jigsaws of the preferred type are well known and fully described in U.S. Pat. No. 4,238,884, which is hereby incorporated by reference herein. Therefore, the present description will summarize relevant background information concerning the design and operation of the preferred embodiment of the pendulum jigsaw and will focus on the switch assembly 7 for manually adjusting the orbital blade pat in accordance with the preferred embodiment of the invention herein.

Jigsaw 1 has a housing 2 including a handle 3, which incorporates a switch 4 and a motor 5. The motor 5 has an armature 6 which drives a gear 8 journalled in the housing 2 about an axis 10.

A cage 12 is fixed in the housing and mounts a blade carrier 14. Pin 16 transfers rotary motion of the gear 8 about ax is 10 into reciprocating motion of the blade carrier 14 in the direction of the arrows X. The carrier 14 is slidably mounted in the cage 12. The saw blade drive mechanism constituted by gear 8, pin 16 and blade carrier 14 is of the scotch yoke type as is more fully shown and described in U.S. Pat. No. 4,238,884, column 2, line 57 et seq.

Carrier 14 can pivot to a small extent about axis 18 (perpendicular to the page in FIG. 1) at a top part 20 of the cage 12, while a bottom part 22 of the cage 12 allows pivotal movement of the carrier 14 in the direction of the arrows Y. Biasing means (not shown) in the bottom part 22 press the carrier 14 towards the right in the drawings and may be constituted by a coil spring.

The carrier 14 carries a removable blade 24 at its lower end. The blade 24 is supported in the direction of the feed of the jigsaw (see arrow F in FIG. 1) by a support wheel 26. The support wheel is journalled in a bell crank lever 28 pivoted in the housing about axis 30.

The other end, 32 of the bell crank lever is acted on by one end of a drive pin 34 slidably received in a cross bore 38 of an adjustment shaft 36. The adjustment shaft 36 is rotatably journalled in the housing about an axis 40.

Figure 2:
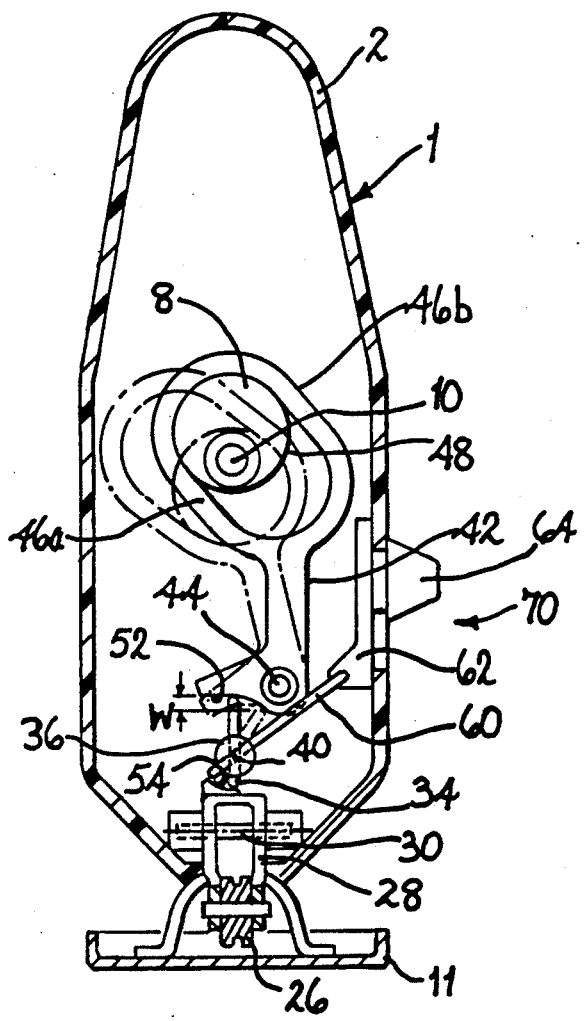
FIG. 2 is a section on the line II—II in FIG. 1.
Figure 3A:
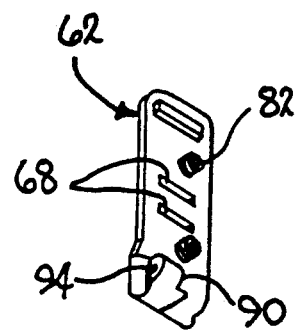
FIG. 3A and 3B are perspective views of the carrier and spring respectively as shown in more detail in FIGS. 4 to 6.
Figure 3B:
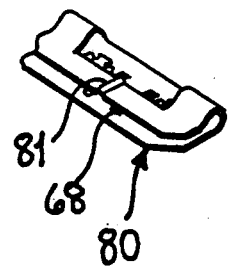

The other end of the drive pin 34 is acted upon by a fork lever 42 pivoted in the housing about an axis 44 (see also FIG. 2). The fork lever 42 has fork arms 45a, b journalled around a circular cam surface 48 eccentrically formed on gear 8. The cam surface 48 also mounts a counterweight 50 which is adapted to balance the forces generated by the reciprocation of the carrier 14 etc. Counterweight 50 reciprocates with carrier 14 in the direction of the arrows X, but 180° out of phase with respect thereto. Counterweight 50 and gear 8 with cam 48 together form a scotch yoke drive and operate in the same manner as is more fully described in U.S. Pat. No. 4,238,884.

The fork lever 42 and bell crank lever 28 are each provided with circular cam surfaces 52, 54 respectively, each of which is acted upon by the drive pin 34 and each of which is centered on the rotation axis 40 of the adjustment shaft 36.

As explained more fully in U.S. Pat. No. 4,238,884, column 5, line 24 et seq., rotation of shaft 36 changes the distance between the axis of drive pin 34 and the axis 44 of rotation of fork lever 42 and thereby the amplitude of oscillation of drive pin 34.

Thus in the position shown in FIG. 2, the reciprocation of the fork lever 42 between the two positions shown (one in dashed, the other in solid lines) as the gear 8 rotates, causes the drive pin 34 to reciprocate along its axis by an amount W.

This reciprocation is transmitted from surface 52, through the pin 34, to the surface 54 on the bell crank lever 28. Referring again to FIG. 1, the bell crank lever passes this reciprocation to the blade 24 through the support wheel 26 in the direction of the arrows Y and against the bias of the biasing means in the bottom part 22 of the cage 12.

If, however, the shaft 36 is rotated about its axis 40 so that the drive pin 34 adopts the position shown in dotted lines in FIG. 2, then it can be seen that the reciprocation of the fork lever 42 has no effect on the position of the pin 34 and consequently there is no reciprocation in the Y direction of the blade 24. Intermediate positions of the shaft 36 and pin 34 results in intermediate reciprocation of the blade.

Rotational adjustment of the shaft 36 is effected by an adjustment pin 60 which is a sliding fit in another cross bore 61 of the shaft 36. This pin is pivoted at its other end in a carrier 62 which is slidably disposed at the side of the housing 2. A knob 64 is connected to the carrier 62 and is manually actuable.

Figure 4:
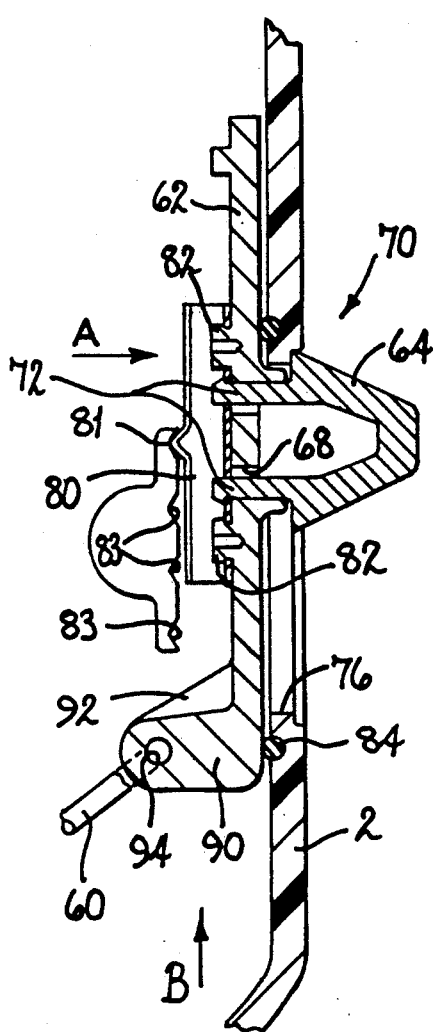
FIG. 4 is a detailed section through the slide switch shown in FIG. 2.
Figure 5:
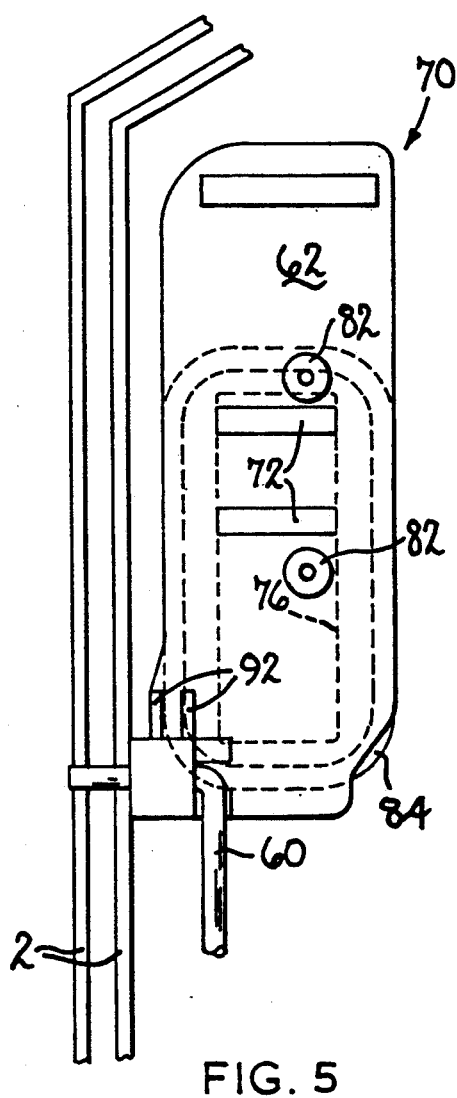
FIG. 5 is a view in the direction of the arrow A in FIG. 4.
Figure 6:
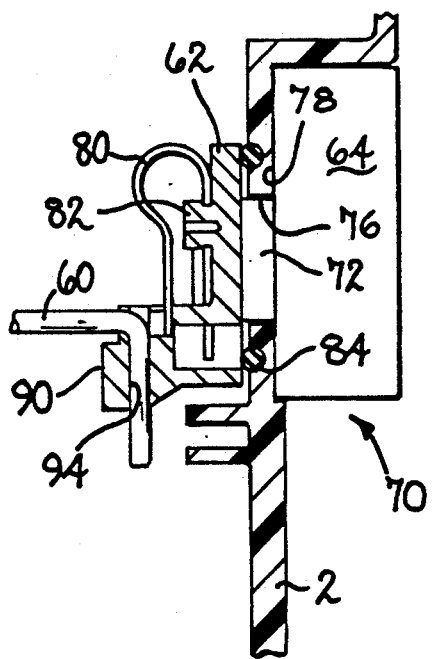
FIG. 6 is a view in the direction of the arrow B in FIG. 4.

The switch 70 formed by carrier 62 and knob 64 is shown in greater detail in FIGS. 4 to 6.

The carrier 62 is essentially rectangular and has two slots 68 through which legs 72 of the knob 64 are adapted to pass. The legs 72 are adapted to snap into engagement with the slot 68. The housing 2 has in this region a rectangular aperture 76 through which the legs 72 protrude.

A shoulder 78 on the knob 64 prevents the knob from passing through aperture 76.

A spring 80 is mounted on the carrier 62 after insertion of the legs 72 of the knob 64. The spring is mounted on two studs 82 and has slots corresponding with the slots 68. The slots of the spring 80 are adapted to prevent the legs 72 disengaging the slot 68 and thus serve to lock the knob 64 into position.

A seal 84 around the aperture 76 seals the carrier 62 with respect to the housing, so preventing the ingression of dust.

The carrier 62 has a lug 90, supported by fillets 92 and in the end of the lug 90 is formed a bore 94 in which the adjustment pin 60 is pivotally located. It is held against axial movement in the bore 94 by its location in shaft 36.

The spring 80 has a lip 81 which is adapted to snap into one of four detents 83 formed in the housing 2. These provide positive locations of the switch 70 between two extreme positions and two intermediate positions. The spring also sets the force for the carrier 62 to ride on the grease seal 84.

The switch and adjustment pin constitute a switch assembly 7 for rotating the shaft and adjusting the amplitude of reciprocation of the drive pin.

It should be appreciated that references herein to the "housing" of the jigsaw also includes other parts secured in the housing. In this respect, most of the components referred to herein as being mounted in or with respect to the housing are in fact mounted in other components which themselves are ultimately mounted in the housing. This is particularly the case with respect to the rotational and reciprocational elements described above which may be mounted in a separate housing securely fixed to the motor. However, this has no relevance to the workings of the present invention.

Thus by this simple mechanism for rotational adjustment of the shaft 36, the need for it to project out of the rear of the housing 2 and be provided with a knob for manual adjustment is removed. This enables the gap between the bottom of the housing 2 and shoe plate 11 of the saw to be employed as a passage 100 for a vacuum extraction means for removing dust as it is produced during sawing. Thus passage 100 opens at 102 above and behind the blade 24 and may be connected at 104 to a vacuum source such as a domestic vacuum cleaner or special vacuum extractor (neither shown). In the event, this design provides for a more balanced styling and a more compact arrangement of the saw as a whole.

We claim:

1. A saw comprising:
   a housing;
   a blade carrier reciprocally slidable in a first direction;
   a drive train for reciprocally driving the carrier, the train comprising a gear having a cam surface;
   a fork lever journalled on the gear cam surface and pivoted about a first axis perpendicular to the first direction, the fork lever having a cam formed on one end;
   a shaft rotatably mounted about a second axis parallel to the first axis;
   a bell crank pivoted in the housing about a third axis perpendicular to the first direction and to the first and second axes;
   a drive pin reciprocally slidably mounted in the shaft, having one end engaging the cam on the fork lever and having a second end engaging one end of the bell crank;
   a wheel carried by the bell crank, disposed behind and supporting in the saw feed direction a blade in the carrier, and reciprocally movable in the saw feed direction through operation of the fork lever, drive pin and bell crank;
   a switch assembly for rotating the shaft and adjusting the amplitude of reciprocation of the drive pin; and
   the switch assembly comprising (1) a manually acutable slide switch movably mounted in the housing in a plane spaced laterally from the shaft and (2) an adjustment pin interconnected between the shaft and the slide switch.

2. The saw of claim 1, further comprising:
   means for allowing the distance between the slide switch and the shaft to change; and
   the switch mounted in the housing for movement in the first direction along a straight line.

3. The saw of claim 2 wherein the allowing means comprises the adjustment pin being pivotably connected to the slide switch and slidably fitted in a cross bore int he shaft.

4. The saw of claim 2 or 3, wherein:
   the slide switch comprises a knob slidably mounted in a rectangular slot in the housing;
   a switch carrier is mounted on the knob inside the housing, covers the slot and has detents formed thereon;
   spring means are mounted on the switch carrier and engage one of the detents to locate the slide switch in different positions; and
   the switch carrier has means to pivot the adjustment pin on the carrier.

5. The saw of claim 4 wherein the allowing means comprises a bore in the switch carrier parallel to the first and second axes.

6. The saw of claim 3, wherein the allowing means comprises a bore in the switch carrier parallel to the first and second axes.

7. The saw of claim 1 or 2 further comprising a vacuum extraction passage formed in the housing below the motor and having an opening above and behind the blade.

* * * * *